T. J. MULLEN & T. F. BRENNAN.
PNEUMATIC SPRING.
APPLICATION FILED NOV. 19, 1909. RENEWED FEB. 24, 1912.

1,039,578.

Patented Sept. 24, 1912.
10 SHEETS—SHEET 2.

T. J. MULLEN & T. F. BRENNAN.
PNEUMATIC SPRING.
APPLICATION FILED NOV. 19, 1909. RENEWED FEB. 24, 1912.

1,039,578.

Patented Sept. 24, 1912.
10 SHEETS—SHEET 3

Inventors
Thomas J. Mullen
Thomas F. Brennan,

T. J. MULLEN & T. F. BRENNAN.
PNEUMATIC SPRING.
APPLICATION FILED NOV. 19, 1909. RENEWED FEB. 24, 1912.

1,039,578.

Patented Sept. 24, 1912.
10 SHEETS—SHEET 4.

Witnesses
H. Strauss
E. C. Duffy

Inventors
Thomas J. Mullen,
and Thomas F. Brennan,
By Mason Fenwick Lawrence,
Attorneys T. J. MULLEN & T. F. BRENNAN.
PNEUMATIC SPRING.
APPLICATION FILED NOV. 19, 1909. RENEWED FEB. 24, 1912.

1,039,578.

Patented Sept. 24, 1912.
10 SHEETS—SHEET 5.

Witnesses
H. Strauss
O. C. Duffy

Inventors
Thomas J. Mullen
and Thomas F. Brennan.
By Mason Fenwick Lawrence,
Attorneys T. J. MULLEN & T. F. BRENNAN.
PNEUMATIC SPRING.
APPLICATION FILED NOV. 19, 1909. RENEWED FEB. 24, 1912.

1,039,578.

Patented Sept. 24, 1912.
10 SHEETS—SHEET 6.

Witnesses
H. Strauss
E. C. Duffy

Inventors
Thomas J. Mullen
Thomas F. Brennan,
By Mason Fenwick Lawrence,
Attorneys T. J. MULLEN & T. F. BRENNAN.
PNEUMATIC SPRING.
APPLICATION FILED NOV. 19, 1909. RENEWED FEB. 24, 1912.

1,039,578.

Patented Sept. 24, 1912.
10 SHEETS—SHEET 9.

Witnesses
H. Strauss
D. C. Duffy

Inventors
Thomas J. Mullen
and Thomas F. Brennan,
By Mason Fenwick Lawrence,
Attorneys

UNITED STATES PATENT OFFICE.

THOMAS J. MULLEN AND THOMAS F. BRENNAN, OF NEW BRIGHTON, NEW YORK.

PNEUMATIC SPRING.

1,039,578.   Specification of Letters Patent.   Patented Sept. 24, 1912.

Application filed November 19, 1909, Serial No. 528,987. Renewed February 24, 1912. Serial No. 679,769.

*To all whom it may concern:*

Be it known that we, THOMAS J. MULLEN nd THOMAS F. BRENNAN, citizens of the United States, residing at New Brighton, in the county of Richmond and State of New York, have invented certain new and useful Improvements in Pneumatic Springs; and we do hereby declare the following to be a full, clear, and exact description of the invention, such as will enable others skilled in the art to which it appertains to make and use the same.

This invention relates to pneumatic springs for vehicles especially designed for use in automobiles but not limited to such association.

An object of the present invention is to provide an improved form of pneumatic bag or cushion to be interposed between the running gear and body of a vehicle with improved accessories associated with such pneumatic bag.

A further object of the invention is to provide improved mountings for a pneumatic bag, one of which is connected with the body and the other part of which is connected with the running gear with improved means for permitting a sliding movement between such parts.

With these and other objects in view, the invention comprises certain novel constructions, combinations and arrangements of parts, as will be hereinafter fully described and claimed.

In the drawings.

Like characters of reference designate corresponding parts throughout the several views.

As shown at Figs. 1 to 7 inclusive the bracket member 50 is adapted to be secured to the axle 51 of the vehicle by the axle being inserted through the opening 52, or in any approved manner. The bracket 50 is provided with upstanding parallel guides 53 between which the block 54 is adapted to slide. The bracket 50 is provided with a depression 55 adapted to receive the base 56 of the pneumatic bag 57, and a collar comprising the sections 58 and 58' is adapted to be secured upon the bracket member 50 and to maintain the pneumatic bag in position by engaging the out-turned flanges of the base 56. The sliding block 54 is also provided with a socket 59 adapted to receive the protuberance 60 formed upon the bag 57 so that the bag is positioned between the sliding block 54 and the bracket 50 and prevented from tilting by engagement with the depressions 55 and 59. It will thus be seen that the pneumatic bag 57 is inclosed between the sliding block 54 and bracket 50 and that as the block 54 slides relative to the bracket under the compression of the vehicle the pneumatic bag 57 is compressed against the tension of the inclosed air. To limit the movement and prevent displacement of the block 54 beads 61 are employed having tongue and groove connection as indicated at 62 and further secured by bolts or rivets inserted through the hole 63. Provision for connecting the sliding block with the body is made in the plate 64 provided with holes 65 through which clips 66 extend to engage the spring 67 or other member connected directly or indirectly with the body of the vehicle.

As shown at Figs. 8 to 11 a bracket is employed here numbered 68 adapted to be secured to the axle similar to the device shown at Figs. 1 to 7 by having the axle inserted through the opening 52 and a sliding block 69 is likewise employed. In this instance, however, the bracket 68 is provided with upstanding abutments 70 without guides, guides being formed as at 71 upon the sliding block 69. The bracket 68 is provided with a depression 55 and the sliding block with a depression 59 for the purpose of similarly receiving and positioning the pneumatic bag 57. In this embodiment to limit the separating movement of the block 69 and bracket 68 a stirrup 72 is employed rigidly connected with the sliding block 69 as by the bolts 73 inserted into the holes 74 and passing about under the extremities 75 of the bracket 68. It will thus be apparent that as the block 69 and bracket 68 separate the lower extremity of the stirrup 72 will engage against the extremities 75 and limit the separating movement.

Figure 1:
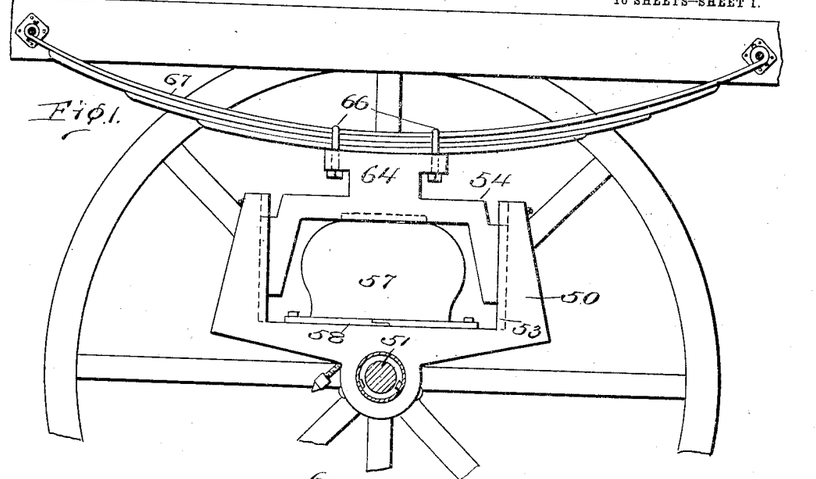
—Figure 1 is a view in side elevation of one embodiment of the present invention shown one part connected with the spring of a vehicle and the other part connected with an axle.
Figure 2:
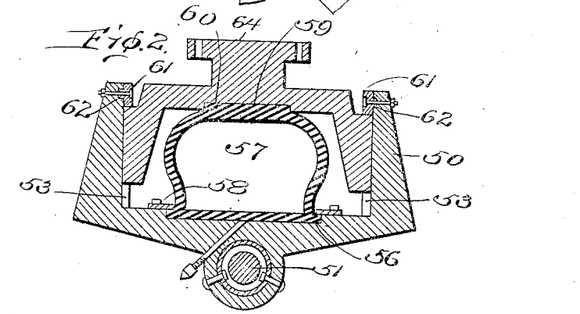
Fig. 2 is a longitudinal sectional view of the embodiment shown at Fig. 1.
Figure 3:
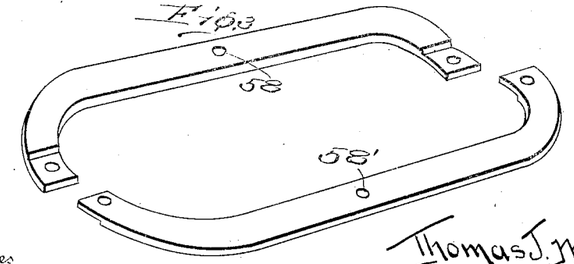
Fig. 3 is a perspective view of the collar adapted to maintain the pneumatic bag in engagement with the supporting part.
Figure 4:
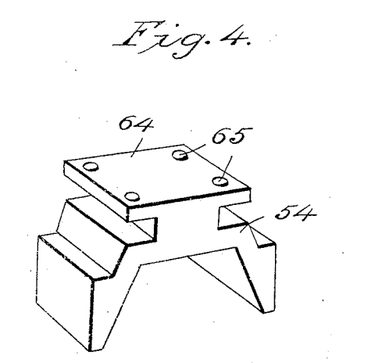
Fig. 4 is a perspective view of one of the sliding parts being the part which is connected with the body of the vehicle.
Figures 5, 6, 7:
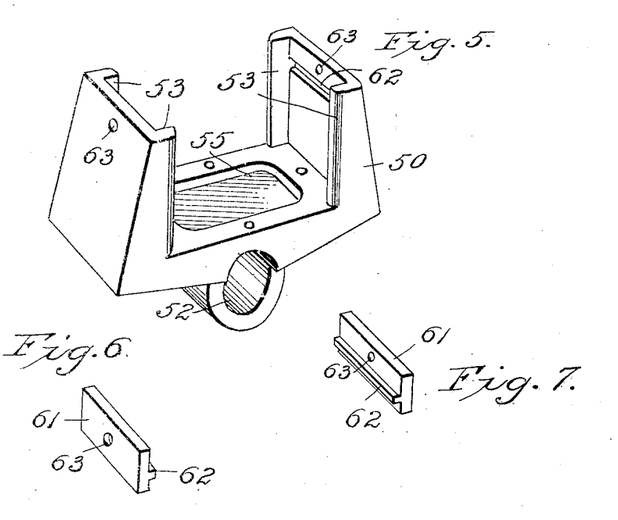
Fig. 5 is a perspective view of one of the sliding parts being the part which is connected with the running gear.
Figs. 6 and 7 are, respectively, beads which are secured to the part shown at Fig. 5 to prevent accidental displacement of the parts shown at Fig. 4.
Figures 8, 11:
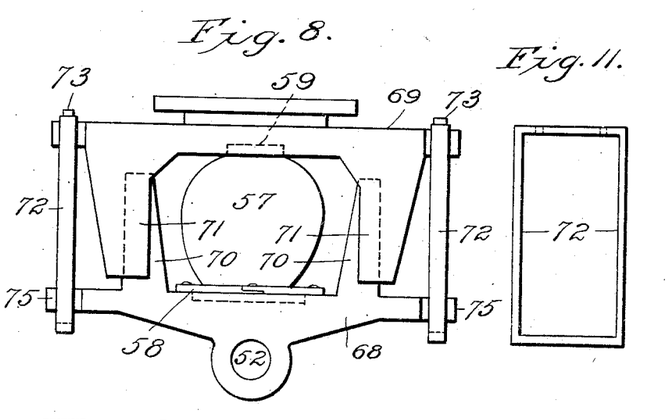
Fig. 8 is a view in side elevation of a very slightly different embodiment of the invention.
Fig. 11 is a view in end elevation of the strap employed to connect the sliding part shown at Figs. 9 and 10 to prevent accidental displacement thereof.
Figures 9, 10:
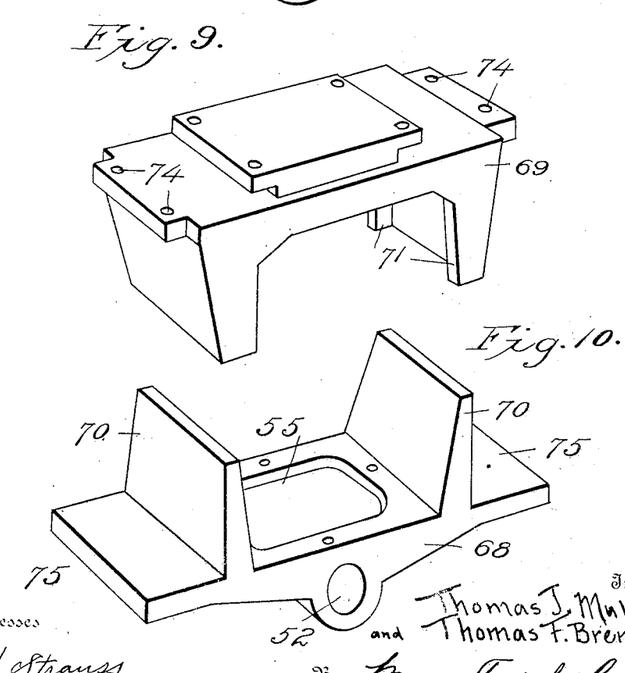
Fig. 9 is a perspective view of the sliding part which is connected with the body of the vehicle.
Fig. 10 is a perspective view of the sliding part which is connected with the running gear of the vehicle.
Figure 12:
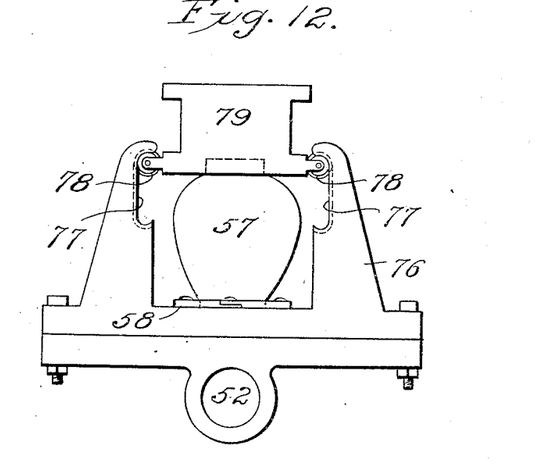
Fig. 12 is a view in side elevation of a slightly different embodiment of the invention showing anti-friction rollers for preventing frictional engagement between the moving parts.
Figure 13:
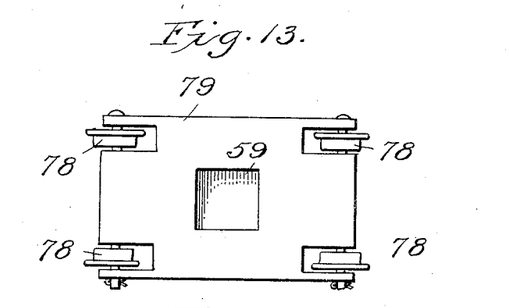
Fig. 13 is a view in inverted plan of the sliding part shown at Fig. 12 which is adapted for connection with the body.

As shown at Figs. 12 and 13 the bracket here numbered 76 is provided with cut-out recesses 77 in which move the flanged rollers 78 which are mounted on the sliding block 79, the inturned material at the extremities of the cut-out portion 77 serving to limit the movement of the sliding block in both directions.

Figure 14:
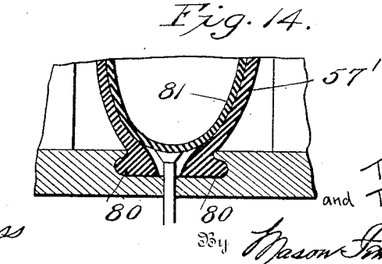
Fig. 14 is a fragmentary view showing the adaptation of the device for use with a pneumatic bag of the clencher type instead of the type shown at Fig. 2.
Figures 15, 16:
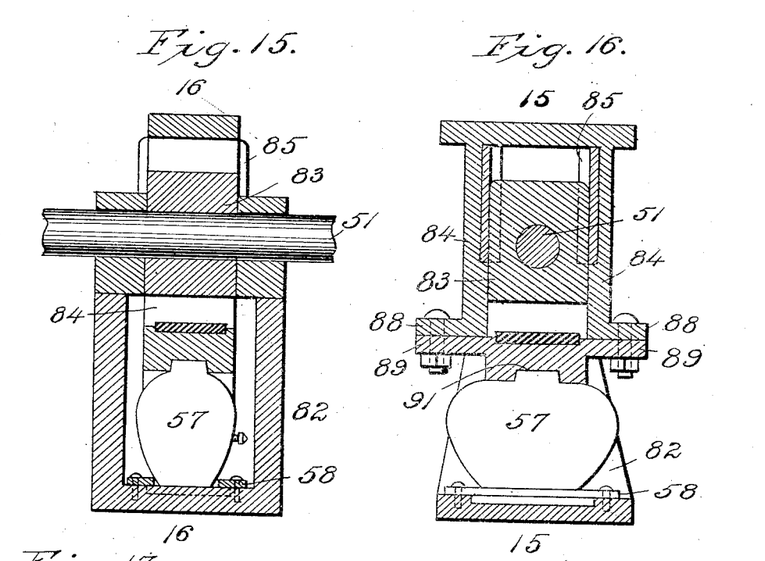
Fig. 15 is a sectional view longitudinally of the axle of a device for mounting the pneumatic bag below the axle.
Fig. 16 is a transverse sectional view taken at right angles to the plane of Fig. 15 as indicated.
Figure 17:
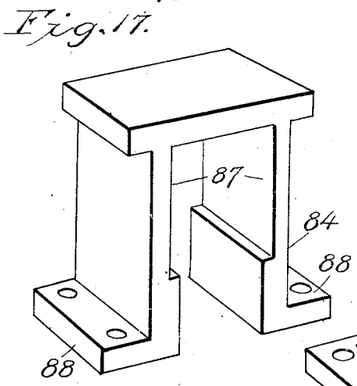
Fig. 17 is a perspective view of the yoke which embraces the axle in the embodiment shown at Figs. 15 and 16.
Figure 18:
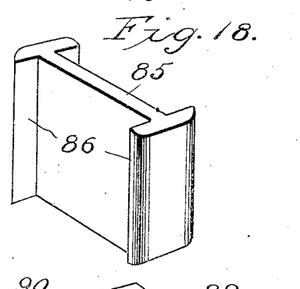
Fig. 18 is a removable guide carried by the side of the yoke shown at Fig. 17.
Figure 19:
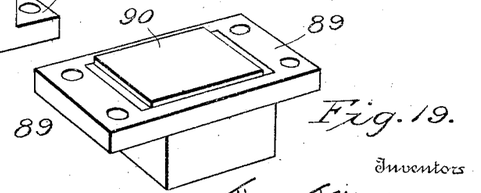
Fig. 19 is a perspective view of the plate carried at the lower end of the yoke shown at Fig. 17 and which is adapted to engage and position the pneumatic bag.

In the figures shown from 1 to 13 the pneumatic bag has been shown with a solid base adapted to be secured within the depression 55 by the removable collar 58. It is not necessary, however, to employ this particular form of base on the pneumatic bag as a bag of the clencher type may be employed shown at Fig. 14 as 57' with the clencher flanges 80 connected in a dove-tailed depression in the bracket in the usual manner in this case an inner tube 81 being employed. In some instances it is not expedient to mount the pneumatic bag and associated accessories above the axle or between the axle and the body owing to the build of the machine and for such instances provision is made for mounting the pneumatic bag below the axle by employing the associated parts shown at Figs. 15 to 19. In this case a yoke 82 is depended from the axle 51 by means of a block 83 rigidly secured to the axle with the yoke rigidly secured thereto or integral therewith. Over the block 83 a stirrup 84 slides having a detachable block 85 provided with guide flanges 86 seated within the depression 87 in the stirrup 84 with the guide flanges 86 upon opposite sides of the block 83 to prevent lateral movement. At its lower extremity the stirrup 84 is provided with out-turned flanges 88 to which is secured a keeper shown in perspective at Fig. 19 comprising flanges 89 adapted to be secured to the flanges 88 as shown at Fig. 16 and carrying a cushion 90 adapted to contact with the block 83 upon the upward movement of the body and having on its under side a depression 91 adapted to position the pneumatic bag 57.

Figure 20:
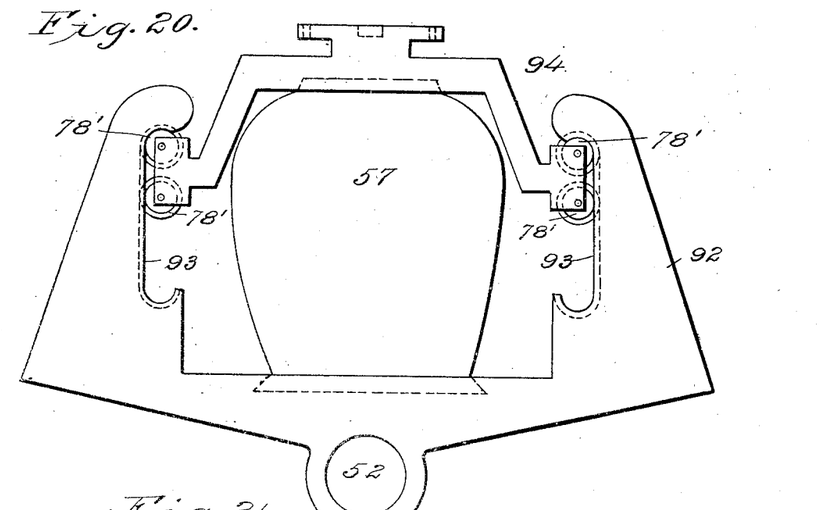
Fig. 20 is a slightly different embodiment of the present invention showing anti-friction rollers in plan the same as that shown at Fig. 12 but with a different arrangement.
Figures 21, 22, 23, 24:
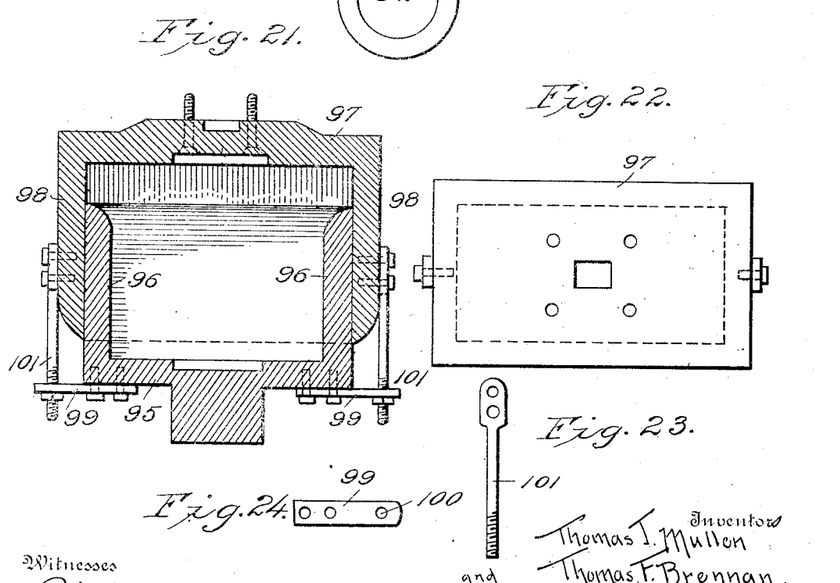
Fig. 21 is a transverse sectional view of the box type of bag mounting.
Fig. 22 is a top plan view of the embodiment shown at Fig. 21.
Fig. 23 is a view in side elevation of the limiting bolt carried by the type of mounting shown at Figs. 21 and 22.
Fig. 24 shows the clip through which the bolt shown at Fig. 23 slides.

As shown at Fig. 20 the bracket here numbered 92 has a guide-way 93 formed therein similar in general respects to that shown at Fig. 12, except that two of the anti-friction rollers 78' are employed to position the sliding block 94 which is designed to prevent more effectually the possibility of binding the parts. Under some conditions it is found desirable to wholly inclose the pneumatic bag and for this purpose the box type of mounting is provided shown at Fig. 21 wherein the box 95 takes the place of the brackets heretofore employed, such box having upstanding sides 96 over which the cover member 97 is adapted to slide having downwardly extending sides 98 embracing the upstanding sides 96. To limit the upward movement of the cover 97 under the expansion of the bag inclosed therein an ear 99 is secured rigidly to opposite sides of the box 95 and provided with an opening 100 through which extends a bolt 101 rigidly secured to the side 98 of the cover as shown at Fig. 21.

Figure 25:
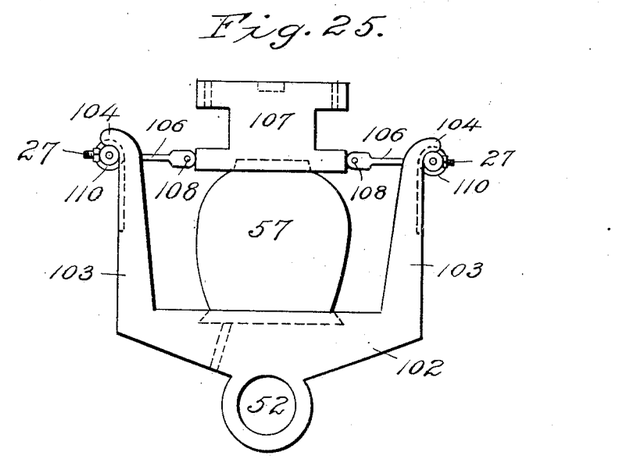
Fig. 25 is a view in side elevation of a type of mounting having anti-friction rollers disposed outside instead of inside the member secured to the running gear.
Figures 26, 27, 28:
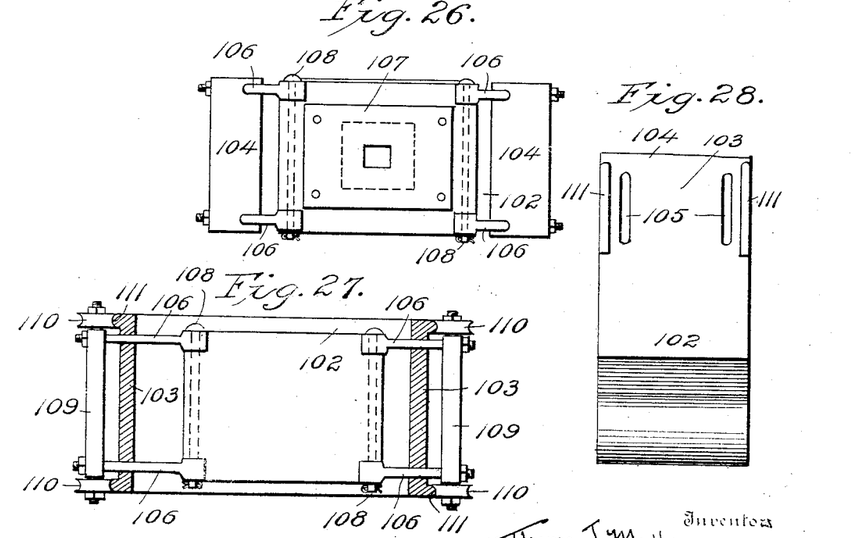
Fig. 26 is a top plan view of the embodiment shown at Fig. 25.
Fig. 27 is a horizontal sectional view taken on line 27—27 of Fig. 25.
Fig. 28 is a view in end elevation of the member shown in the embodiment shown at Fig. 25 which is adapted to be secured to the running gear.

As shown at Fig. 25 the bracket 102 has upstanding ends 103 curved outwardly at their upper extremities as at 104 and also provided with slots 105 through which extend links 106 pivoted to the block 107 as at 108 and rigidly connected with a cross bar 109 at each end having journaled thereon rollers 110 here shown as grooved and bearing and moving upon ribs 111 formed upon the ends 103.

Figures 29, 30, 31:
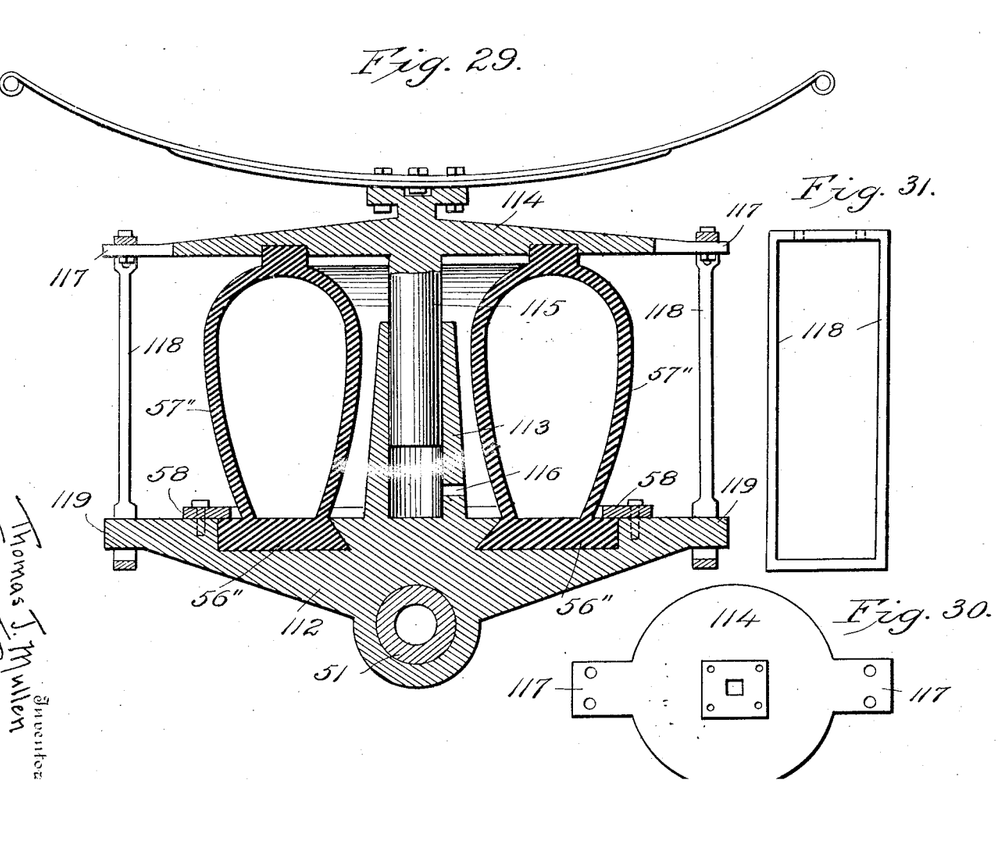
Fig. 29 is a view in diametrical section of an annular pneumatic bag with associate parts.
Fig. 30 is a view in top plan of the embodiment shown at Fig. 29 disconnected from the spring.
Fig. 31 is a view in end elevation of the limiting stirrup used upon the embodiment shown at Fig. 29.

As shown at Figs. 29 to 31 provision is made for employing an annular pneumatic bag 57'' having also an annular base 56'' which is mounted in the annular groove formed in the bracket here shown as 112. The bracket 112 is substantially circular in general form and is provided centrally with an upstanding hollow socket member 113 while the sliding block 114 also circular in general plan is provided with a stud 115 adapted to reciprocate vertically within the socket member 113 a vent 116 being provided to prevent the compression of air within the socket member 113. The block 114 is provided upon opposite sides with outstanding lugs 117 to which are secured links 118 passing down and under lugs 119 outstanding from diametrically opposite sides of the bracket 56''. The link 118 at the upward movement of the block 114 engages under the lugs 119 and limits the upward movement of such block.

The devices illustrated and described in connection with Figs. 1 to 31 inclusive have been intended to be applied at each end of each axle, that is to say, four of the devices under each body. It is not necessary, however, to employ four as by increasing the size of the pneumatic bags and associated parts, one under each end of the body between the body and the running gear will be found sufficient.

Figure 32:
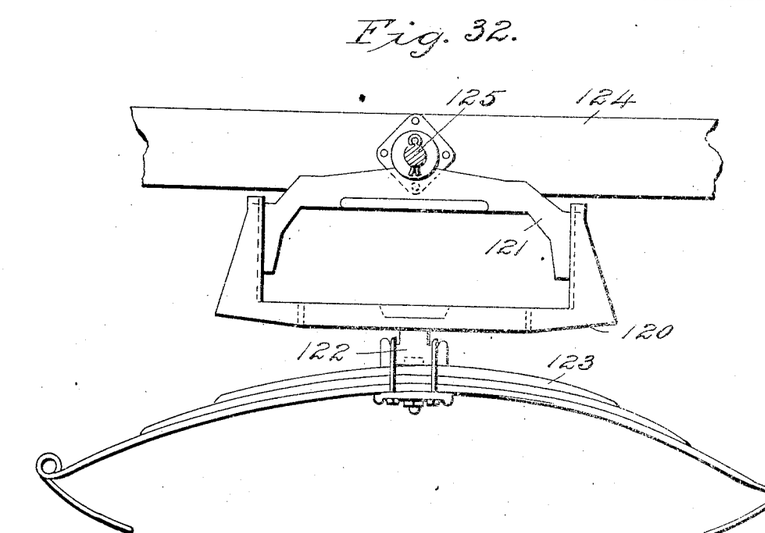
Fig. 32 is a view in side elevation of an embodiment of the present invention adapted to be used directly under the end of a body, a single one of the devices to carry each end of the body and is secured at the lower side to the running gear.

At Fig. 32 a member which has heretofore been called a bracket is shown at 120 associated with the sliding block 121 and secured centrally as indicated at 122 with a spring 123 supposed to be the spring under an end of the body 124. As shown the sliding block 121 is pivoted to the body 124 as at 125 but in all other respects operates the same as the smaller devices heretofore described.

Figure 33:
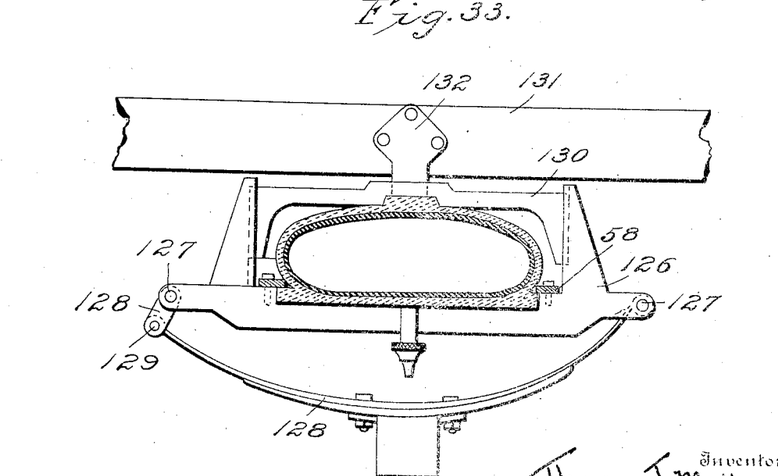
Fig. 33 is a view in section of the embodiment shown at Fig. 32.

At Fig. 33 the block 126 is pivotally connected at opposite ends as at 127 with the spring 128 also supposed to be a different type of spring under the end of the body, one end being preferably connected with the spring by means of the link 128 pivoted directly to the spring at 129. The sliding block 130 in this case is not shown as pivoted to the body 131 but is rigidly connected therewith as at 132.

Figure 34:
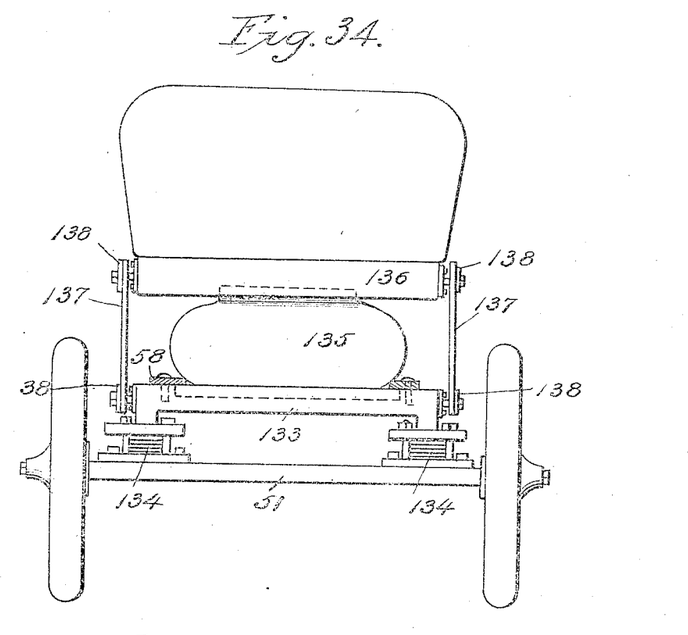
Fig. 34 is a view of a different embodiment of the pneumatic bag mounted under the end of the body with different accessories.
Figures 35, 36:
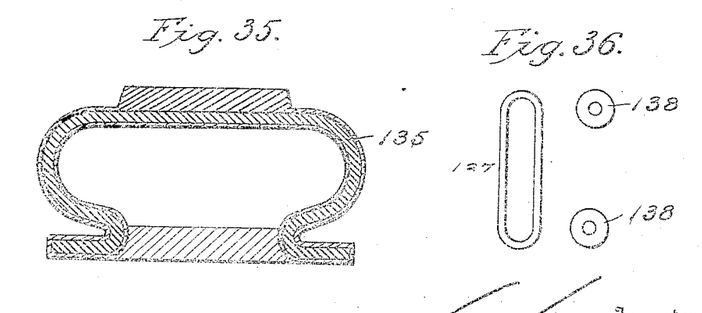
Fig. 35 is a view in transverse section of the bag employed in the embodiment shown at Fig. 34.
Fig. 36 is a view of the limiting link and securing washers associated with the embodiment shown at Fig. 34.

At Fig. 34 an embodiment is shown where a longitudinally extending leaf spring is employed under each corner of the body in which case a bolster 133 extends transversely of the vehicle and parallel with the axle 51 and is mounted upon the springs 134. In this case a pneumatic bag here numbered 135 is mounted directly upon the bolster 133 and is secured thereon by the usual collar 58. The top of the pneumatic bag bears directly against the under side of the body 136 and upward movement is limited by means of links 137 connected slidably with the bolster 133 and body 136, washers 138 being employed to prevent displacement of the links 137 and to prevent lateral movement of the body relative to the running gear.

From the foregoing description of the various embodiments of the present invention it is believed that the structure and operation of the invention will be thoroughly and completely understood without a more detailed disclosure of such operation.

What we claim is:—

1. In a device of the class described, a bracket provided with a depression, a pneumatic bag provided with a base proportioned to be positioned in the depression, a removable collar adapted to be secured to the bracket and maintain the base of the bag in the depression, and means supported upon the bag adapted for connection with a vehicle body.

2. In a device of the class described, a bracket adapted to be secured to the running gear of a vehicle and provided with a depression, a pneumatic bag provided with a base proportioned to be inserted in the depression, a removable keeper adapted to be attached to the bracket and to maintain the base of the bag in the depression, and means to support a vehicle body on the bag.

3. In a device of the class described, a bracket provided with a depression, a pneumatic bag having a base embodying outwardly extending flanges all proportioned to be positioned in the depression, and a collar adapted to surround the bag and to be secured to the bracket and maintain the bag with the base within the depression.

4. In a device of the class described, a bracket adapted to be connected with the running gear of a vehicle, and provided with a pneumatic-bag receiving depression, and a removable bag-retaining collar carried by the bracket and extending inwardly beyond the lines of the depression.

5. In a device of the class described, a bracket adapted to be secured to the running gear of a vehicle and provided with a pneumatic-bag receiving depression, and a bag-retaining collar formed in separable parts adapted to be secured to the bracket and extend inwardly beyond the lines of the depression.

6. In a device of the class described, a member adapted to be supported by a vehicle axle and embodying a seat provided with a depression, a pneumatic bag adapted to be seated within the depression, a collar adapted to be sucured to the seat and to extend inwardly beyond the lines of the depression and maintain the pneumatic bag in such depression, means adapted to be secured to the body of a vehicle and adapted to slide relative to the member supported from the axle, and embodying a portion adapted to bear upon the top of the pneumatic bag.

In testimony whereof we affix our signatures in presence of two witnesses.

THOMAS J. MULLEN.
THOMAS F. BRENNAN.

Witnesses:
HAMMOND VAN VECHTEN,
FRANK J. SPENCER.